(12) United States Patent
Fujii

(10) Patent No.: US 8,493,615 B2
(45) Date of Patent: Jul. 23, 2013

(54) IMAGE-PROCESSING DEVICE, IMAGE-READING DEVICE, AND IMAGE-FORMING DEVICE

(75) Inventor: Koichi Fujii, Ashigarakami-gun (JP)

(73) Assignee: Fuji Xerox Corporation, Tokyo (JP)

( * ) Notice: Subject to any disclaimer, the term of this patent is extended or adjusted under 35 U.S.C. 154(b) by 951 days.

(21) Appl. No.: 12/544,525

(22) Filed: Aug. 20, 2009

(65) Prior Publication Data
US 2010/0208279 A1 Aug. 19, 2010

(30) Foreign Application Priority Data

Feb. 13, 2009 (JP) ................................. 2009-030998

(51) Int. Cl.
*G06F 5/00* (2006.01)
(52) U.S. Cl.
USPC ............ 358/1.9; 358/3.24; 358/464; 382/168
(58) Field of Classification Search
None
See application file for complete search history.

(56) References Cited

U.S. PATENT DOCUMENTS

| | | | | |
|---|---|---|---|---|
| 5,608,853 | A * | 3/1997 | Dujari et al. ................... | 345/668 |
| 6,118,895 | A | 9/2000 | Hirota et al. | |
| 7,433,085 | B2 * | 10/2008 | Ahmed et al. ................ | 358/3.26 |
| 2005/0286775 | A1 | 12/2005 | Jeffrey et al. | |
| 2006/0274376 | A1 * | 12/2006 | Bailey et al. ................. | 358/3.26 |
| 2008/0055620 | A1 | 3/2008 | Usui et al. | |
| 2008/0266612 | A1 | 10/2008 | Nishioka | |

FOREIGN PATENT DOCUMENTS

| | | |
|---|---|---|
| JP | A-4-37258 | 2/1992 |
| JP | A-5-63968 | 3/1993 |
| JP | A-08-307722 | 11/1996 |
| JP | A-2000-99701 | 4/2000 |
| JP | A-2005-235238 | 9/2005 |
| JP | A-2006-14341 | 1/2006 |
| JP | A-2008-066895 | 3/2008 |
| JP | A-2008-271361 | 11/2008 |

OTHER PUBLICATIONS

Office Action dated Oct. 16, 2012 issued in Japanese Patent Application No. 2009-030998 (with translation).

\* cited by examiner

*Primary Examiner* — Marivelisse Santiago Cordero
*Assistant Examiner* — Kent Yip
(74) *Attorney, Agent, or Firm* — Oliff & Berridge, PLC

(57) ABSTRACT

An image-processing device includes: a first detection unit that, based on a predetermined color component, detects a first pixel value that satisfies a predetermined first base color condition from among the pixel values of pixels included in image data which is to be processed; a pixel determination unit that determines pixels with the first pixel value detected by the first detection unit; a second detection unit that, based on color components other than the predetermined color component, detects a second pixel value that satisfies a predetermined second base color condition from among the pixel values of the pixels determined by the pixel determination unit; and a base color determination unit that determines pixel portions with both the second pixel value detected by the second detection unit and the first pixel value as a base color of an image represented by the image data.

20 Claims, 3 Drawing Sheets

IMAGE-PROCESSING DEVICE, IMAGE-READING DEVICE, AND IMAGE-FORMING DEVICE

CROSS-REFERENCE TO RELATED APPLICATIONS

This application claims priority under 35 USC 119 from a Japanese patent application No. 2009-030998 filed on Feb. 13, 2009.

BACKGROUND

1. Technical Field

The present invention relates to an image-processing device, an image-reading device, and an image-forming device.

2. Related Art

There are known techniques for detecting a base color of a color image.

SUMMARY

An image-processing device according to an aspect of the present invention includes: a first detection unit that, based on a predetermined color component, detects a first pixel value that satisfies a predetermined first base color condition from among the pixel values of pixels included in image data which is to be processed; a pixel determination unit that determines pixels with the first pixel value detected by the first detection unit; a second detection unit that, based on color components other than the predetermined color component, detects a second pixel value that satisfies a predetermined second base color condition from among the pixel values of the pixels determined by the pixel determination unit; and a base color determination unit that determines pixel portions with both the second pixel value detected by the second detection unit and the first pixel value as a base color of an image represented by the image data

BRIEF DESCRIPTION OF THE DRAWINGS

An exemplary embodiment of the present invention will be described in detail based on the following figures, wherein.

DETAILED DESCRIPTION

1. Configuration

Figure 1:
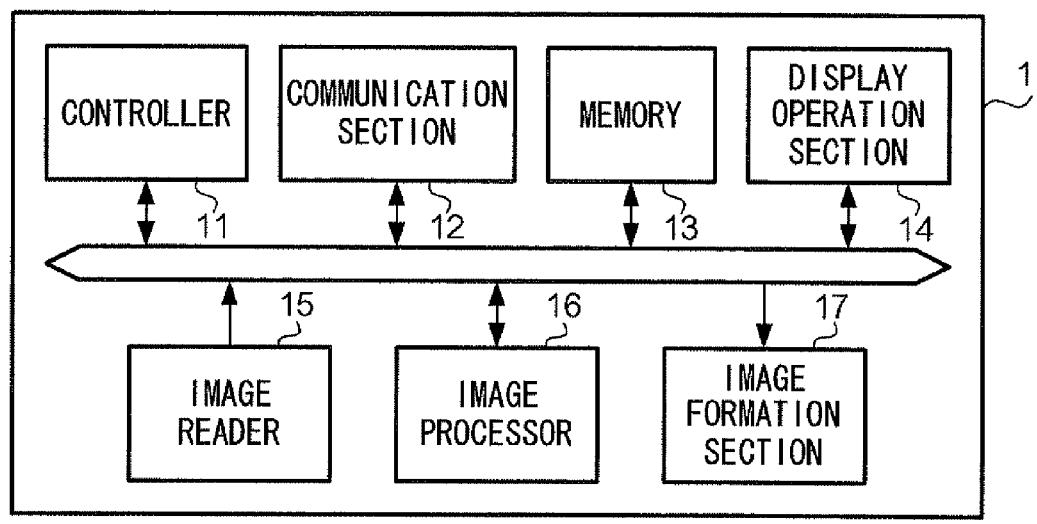
FIG. 1 is a block diagram showing a configuration of an image-forming device related to the exemplary embodiment.

FIG. 1 is a block diagram showing a configuration of an image-forming device 1 that is related to the present exemplary embodiment. As shown in FIG. 1, the image-forming device 1 is provided with a controller 11, a communication unit 12, a memory 13, a display operation unit 14, an image reader 15, an image processor 16, and an image formation unit 17. The controller 11 includes a CPU (Central Processing Unit), a memory, and the like. The CPU executes a program stored in the memory or the memory 13 to allow the controller 11 to control each section of the image-forming device 1. The communication unit 12 establishes communication with an external device connected through a communication line, and sends and receives data. The memory 13 is, for example, a hard disk drive that stores various types of data. The display operation unit 14 is, for example, a touch panel. On the display operation unit 14 are displayed images corresponding to operations carried out by an operator and under control of the controller 11. The image reader 15 is, for example, a scanner that includes a read unit for reading an image on a paper and producing image data of R (red), G (green), and B (blue) components corresponding to that image. The image processor 16 implements various types of image processing according to the image data produced by the image reader 15 or according to image data received from communication unit 12. The image formation unit 17 includes, for example, a printer that forms images via an electrophotographic system. The image formation unit 17 is an image-forming unit that forms images on a paper according to image data that has been processed by the image processor 16.

Figure 2:
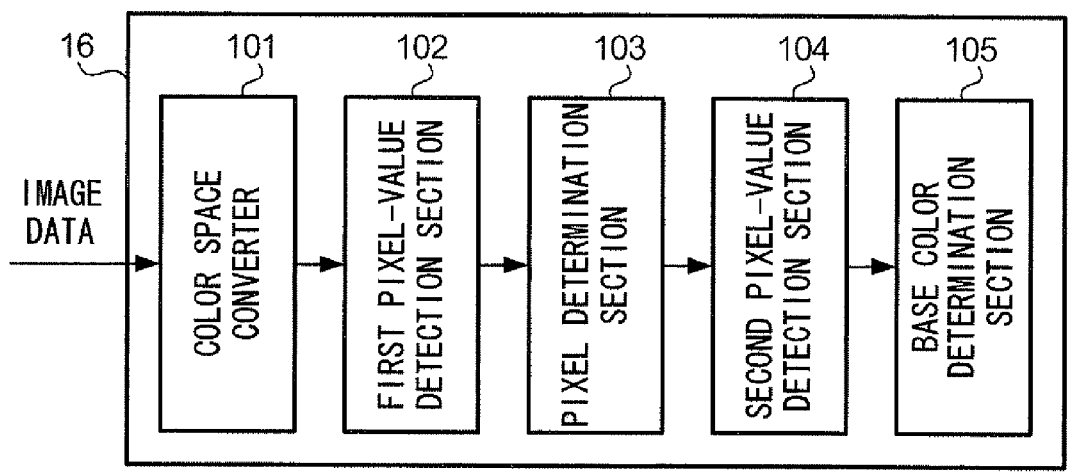
FIG. 2 is a block diagram showing a functional configuration of an image processor of the image-forming device.

Next, a functional configuration of the image processor 16 is described. FIG. 2 is a diagram showing a functional configuration of the image processor 16. As shown in FIG. 2, the image processor 16 is structured according to a functional configuration that includes a color space converter 101, a first pixel-value detection section 102, a pixel determination section 103, a second pixel-value detection section 104, and a base color determination section 105. The color space converter 101 is a color space conversion unit that converts color space of image data into a Y (luminance) CbCr color space that can be handled by the first pixel-value detection section 102. The YCbCr color space is a luminance and chrominance color space. The first pixel-value detection section 102 includes a first detection unit that, based on Y-component image data from among image data of YCbCr components, detects a first pixel value that satisfies a predetermined first base color condition from among pixel values of all pixels included in the image data. This first pixel value is used as the first base color value. The pixel determination section 103 has a function of a pixel determination unit that, based on the Y-component image data, determines pixels with the first pixel value that are detected by first pixel-value detection section 102. The second pixel-value detection section 104 has a function of a second detection unit that, based on CbCr-component data from among the image data of the YCbCr components, detects a second pixel value that satisfies a predetermined second base color condition from among the pixel values of the pixels included in the image data that are determined by the pixel determination section 103. This second pixel value is used as the second base color value. The base color determination section 105 is a base color determination unit that determines pixel portions with the second pixel value that are detected by the second pixel-value detection section 104 as a base color of an image.

2. Operation

Figure 3:
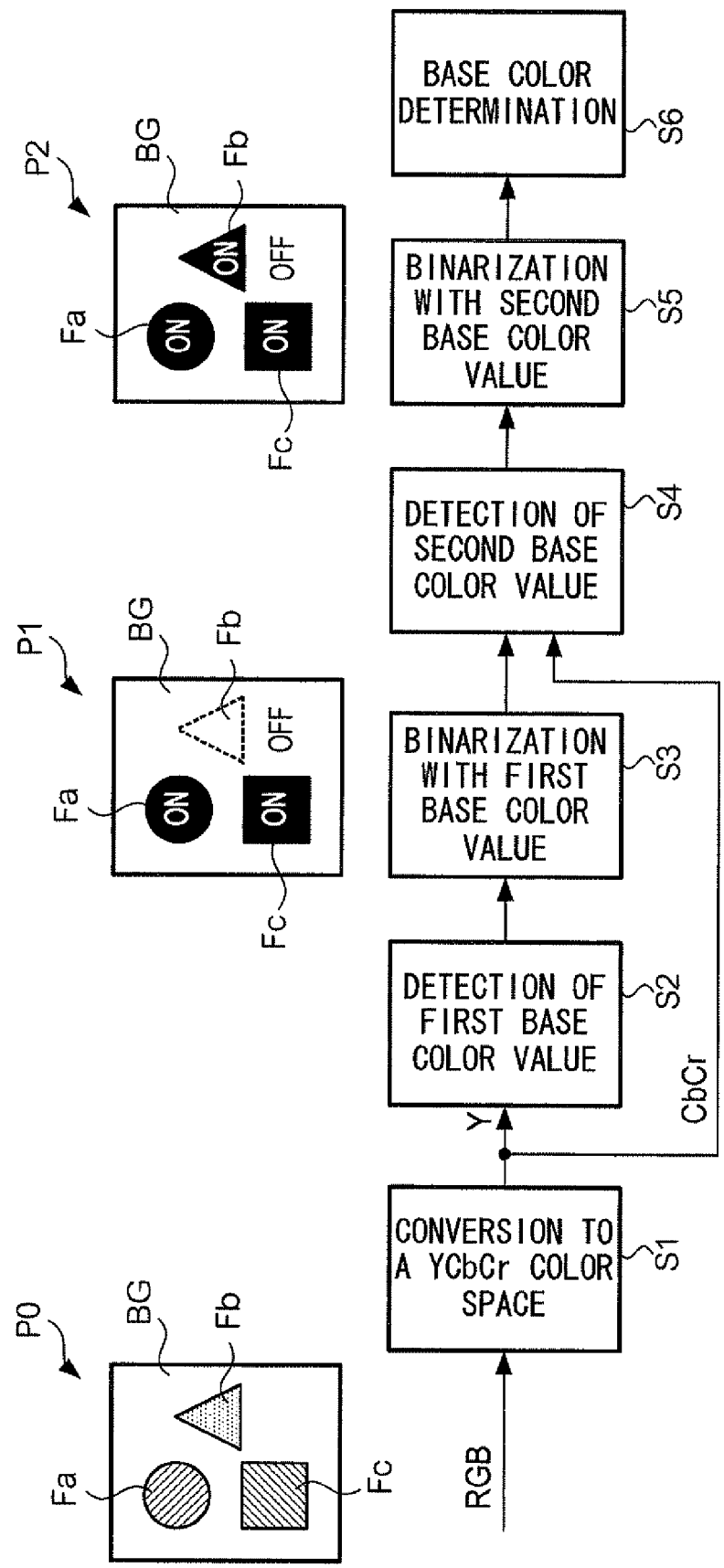
FIG. 3 is a diagram showing a base color detection process of the image-forming device.

Next, operation of the image-forming device 1 related to the present exemplary embodiment will be described. The image-forming device 1 performs a base color detection process that detects base color portions of an image that has been read by the image reader 15. This base color detection process is described below. FIG. 3 is a diagram showing the base color detection process. This figure represents a case in which an original image P0 in the figure is read by the image reader 15. As shown in FIG. 3, the original image P0 includes a white base area BG in which no image has been formed, a red area Fa in which a red graphic image has been formed, the yellow area Fb in which a yellow graphic image has been formed, and a green area Fc in which a green graphic image has been formed. The base area BG constitutes the background area of the image and has the highest pixel count.

Figure 4:
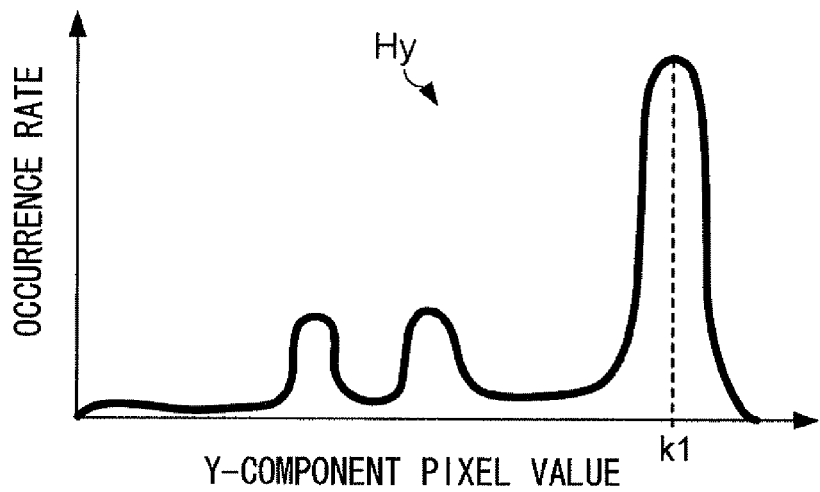
FIG. 4 is a diagram showing a Y-component histogram.

After the original image P0 is read by the image reader 15 and RGB-component image data corresponding to the original image P0 is produced, the produced RGB-component image data is input into the image processor 16. When the RGB-component image data is input, the image processor 16 converts the color space of this image data into a YCbCr color space (step S1). Next, the image processor 16, based on the pixel values of each pixel included in the Y-component image data, detects the first base color value (step S2). Specifically, the image processor 16 first creates Y-component histogram Hy using the pixel values of the Y-component image data. FIG. 4 is a diagram showing an example of histogram Hy that is created at this time. As shown in this figure, in histogram Hy, the peak occurs in the area of pixel value k1. This is the color in the original image P0 where Y-component pixel values of both the base area BG and the yellow area Fb are values close to pixel value k1. In this case, the image processor 16 detects a predetermined range from pixel value k1 as the base color value. In other words, the first base color value is a value with a certain range.

Next, the image processor 16 binarizes each pixel of the image data with the first base color value (step S3 on FIG. 3). Specifically, the image processor 16 determines whether or not the Y-component pixel value of each pixel of the image data is included in the first base color value. If the Y-component pixel value of a pixel subject to this determination is included in the first base color value, the image processor 16 turns that pixel off, and if the Y-component pixel value is not included in the first base color value, the image processor 16 turns that pixel on. In other words, the image processor 16, based on the Y-component image data, determines pixels with the first base color value that is detected in step S2. In this example, as in a binarized image P1 shown in the figure, the Y-component pixel values of the pixels of both the base area BG and the yellow area Fb are included in the first base color value and are therefore turned off, whereas the Y-component pixel values of the pixels of both the red area Fa and the green area Fc are not included in the first base color value and are therefore turned on.

Figure 5A:
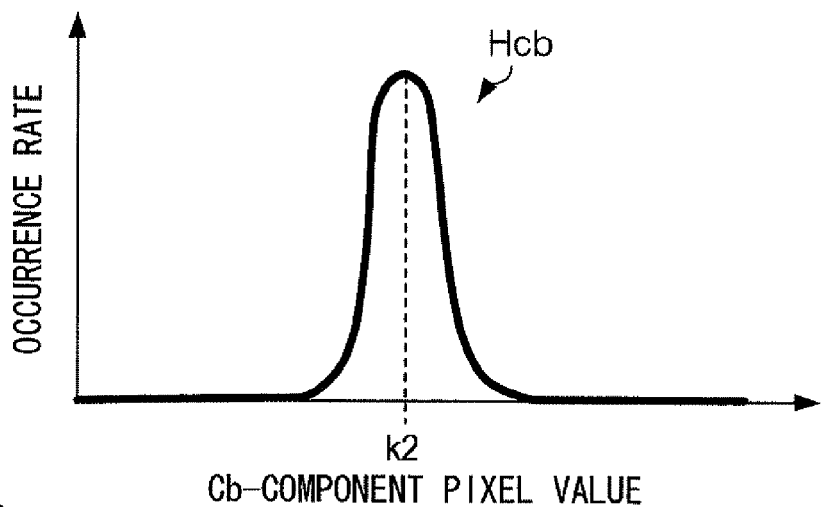
FIG. 5A shows an example of an Hcb histogram.
Figure 5B:
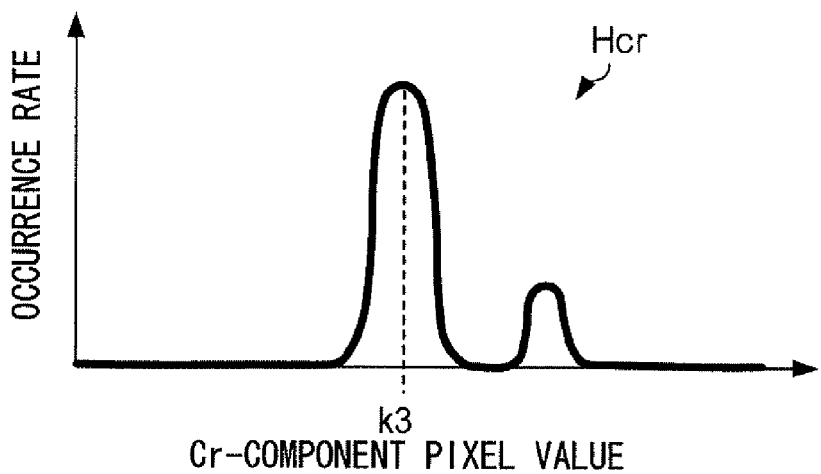
FIG. 5B shows an example of an Hcr histogram.

Next, the image processor 16, based on the pixel values of off-state pixels included in the CbCr-component image data, detects the second base color value (step S4). Specifically, the image processor 16 first creates Cb-component histogram Hcb and Cr-component histogram Hcr using pixel values of the off-state pixels included in the CbCr-component image data. FIG. 5A is a diagram showing an example of an Hcb histogram created at this time, and FIG. 5B is a diagram showing an example of an Hcr histogram created at this time. As shown in FIG. 5A, in the Hcb histogram, the peak appears in the area of pixel value k2. This is the color in the original image P0 where the Cb-component pixel values of both the base area BG and the yellow area Fb become values close to the pixel value k2. In this case, the image processor 16 detects a predetermined range from the pixel value k2 as the second base color value of the Cb component. In other words, the second base color value of the Cb component is a value with a certain range. Moreover, as shown in FIG. 5B, in the Hcr histogram, the peak appears in the area of pixel value k3. This is the color in the original image P0 where the Cr-component pixel value of base area BG, which has the highest pixel count, becomes close to the pixel value k3. In this case, the image processor 16 detects a predetermined range from pixel value k3 as the second base color value of the Cr component. In other words, the second base color value of the Cr component is a value with a certain range.

Next, the image processor 16 binarizes the off-state pixels of the image data with the second base color value (step S5 in FIG. 3). Specifically, the image processor 16 determines whether or not Cb-component and Cr-component pixel values of off-state pixels within the image data are included in the second base color values of the Cb-component and the Cr-component, respectively. If the Cb-component and Cr-component pixel values of the subject pixel are included in the second base color values of the Cb-component and the Cr-component, respectively, the image processor 16 turns that pixel off and if either the Cb-component or Cr-component pixel value is a value other than those described above, the pixel is turned on. In this example, as in binarized image P2 shown in FIG. 3, the pixels of base area BG are turned off because the Cb-component and Cr-component pixel values are included in the second base color values of the Cb component and the Cr component, respectively, and the pixels of the yellow area Fb are turned on because the Cr-component pixel value is not included in the second base color value of the Cr component. Next, the image processor 16 determines the off-state pixel portions as the base color of the image (step S6). In other words, the image processor 16 determines the pixel portions with the second base color value detected in step S4 as the base color of the image. In this example, the part of base area BG in the binarized image P2 is determined as the base color.

3. MODIFIED EXAMPLES

The above has been a description of an exemplary embodiment, but the details of this exemplary embodiment may be modified as follows. Moreover, at least two of the following modified examples and above exemplary embodiment may be combined.

3-1. Modified Example 1

In the base color detection process, YCbCr-component image data was used, but RGB-component image data may be used as an alternative. In this case, there is no need for the image processor 16 to convert the color space of image data into the YCbCr color space. In addition, if image data input into the image processor 16 has a color space that is not a RGB color space, the image processor 16 may convert the color space of the image data into the ROB color space. Moreover, in the detection of a first base color value, instead of Y-component image data, G-component image data may be used. This is because in the RGB color space, the G-component is the color component that most closely approximates luminance. Furthermore, in the detection of the second base color value, instead of CbCr-component image data, RB-component image data may be used.

Similarly, instead of YCbCr-component image data, L*a*b*-component image data may also be used. In this case, the image processor 16 may convert the color space of the RGB-component image data into a L*a*b* color space.

In this way, the image processor 16 detects the first base color value according to image data of a predetermined color component from among image data of multiple color components, and detects the second base color value according to image data of color components other than the predetermined color component from among the image data of the multiple components. Color components that are used as this predetermined color component include those that represent brightness, such as the Y-component in the YCbCr color space or the G component in the RGB color space.

3-2. Modified Example 2

In the base color detection process, during the detection of the second base color value, the second base color value of the Cb-component and the second base color value of the Cr-component are both detected, but detection may involve either one by itself. Moreover, in order to further increase precision, a CbCr-component histogram may be created in order to use the peak area of that histogram as the second base color value.

3-3. Modified Example 3

In the base color detection process, the image processor 16 may convert the resolution of the input image data to a lower resolution. In other words, in this modified example, the image processor 16 is used as an example of a resolution conversion unit. This resolution conversion is performed by, for example, simple pixel skipping. In this case, the image processor 16 uses low-resolution image data only during, for example, the detection of the first base color value or the detection of the second base color value.

Moreover, the image processor 16 may convert the resolution of the input image data to a mid-low resolution or a low resolution lower than a mid-low resolution. In this case, the image processor 16 uses mid-low-resolution image data during the detection of the first base color value and uses low-resolution image data during the detection of the second base color value.

Moreover, the image processor 16 need not convert the image-data resolution itself and may use only the pixel values of some of the pixels included in the image data when creating a histogram. Specifically, this may involve a method of creating a histogram using only the pixel value of 1 out of 4 pixels, for example.

3-4. Modified Example 4

The first base color value and second base color value may be, for example, a single value such as "240" or a range of values such as "226-240". In other words, the "first pixel value" and "second pixel value" described in the present invention may be single values or they may be values with ranges.

3-5. Modified Example 5

In the base color detection process, the peak area of the Y-component histogram was detected as the first base color value, but methods for detecting the first base color value are not limited in this way. For example, by applying the technique described in JP-A-4-37258, low-saturation areas of the Y-component image data may be divided into multiple mutually overlapping saturation areas to create a histogram of each saturation area, and the range of the pixel values in the saturation area closest to the high-saturation side from among saturation areas meeting or exceeding a standard frequency (appearance frequency) may be detected as the first base color value. In other words, the image processor 16, based on the Y-component image data, may detect a first pixel value that satisfies a predetermined first base color condition from among the pixel values of each pixel included in that image data and use it as the first base color value.

Moreover, in the base color detection process, the peak areas of the Cb-component and Cr-component histograms were detected as the second base color value, but methods for detecting the second base color value are not limited in this way. For example, when using image data expressed by a luminance and chrominance color space as in the exemplary embodiment, the range of the pixel values with the highest occurrence rate in a predetermined range near the gray axis (low saturation) may be detected as the second base color value. Alternatively, when using image data expressed by a RGB color space, technology described in JP-A-4-37258 may be applied to detect the second base color value. In other words, the image processor 16, based on the CbCr-component image data, may detect a second pixel value that satisfies a predetermined second base color condition from among the pixel values of off-state pixels included in that image data and use it as the second base color value.

3-6. Modified Example 6

In the exemplary embodiment, an example configuration is described in which the image processor 16 is provided on the image-forming device 1, but the image processor 16 may be provided on a different device. For example, the image processor 16 may be provided on an image-reading device that provides similar functions to image reader 15. Moreover, the image processor 16 may be specified as an image-processing device that is a stand-alone device.

3-7. Modified Example 7

In the exemplary embodiment, the processes conducted by the image processor 16 may be implemented by a single or multiple hardware resource(s), or they may be implemented by a CPU executing a single or multiple program(s). Moreover, these programs may be provided in a stored state on recording media that can be read by a computer device, including magnetic recording media such as magnetic tapes or magnetic disks, optical recording media such as optical disks, magneto-optical recording media, or semiconductor memory. Moreover, the programs may also be downloaded via a communication medium such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-processing device comprising:
    an image processor configured to act as:
        a first detection unit that, based on a predetermined color component, detects a first pixel value that satisfies a predetermined first base color condition from among the pixel values of pixels included in image data which is to be processed;
        a pixel determination unit that determines pixels with the first pixel value detected by the first detection unit by binarizing each pixel of the image data with the predetermined first base color condition to place the pixels of the image data having the predetermined first base color condition in an off state and to place the pixels of the image data not having the predetermined first base color condition in an on state;

a second detection unit that, based on color components other than the predetermined color component, detects a second pixel value that satisfies a predetermined second base color condition from among the pixel values of the pixels determined by the pixel determination unit; and a base color determination unit that determines pixel portions with both the second pixel value detected by the second detection unit and the first pixel value as a base color of an image represented by the image data by binarizing each pixel of the image data with the predetermined second base color condition to place the pixels of the image data having the predetermined second base color condition in an off state and to place the pixels of the image data not having the predetermined second base color condition in an on state, the pixels in the off state being determined as the pixels having the base color of the image.

2. The image-processing device according to claim 1, wherein the predetermined color component is a color component that represents brightness of an image.

3. The image-processing device according to claim 2, wherein:
the first detection unit detects the first pixel value based on luminance component expressed by a luminance and chrominance color space; and
the second detection unit detects the second pixel value based on chrominance component expressed by the luminance and chrominance color space.

4. The image-processing device according to claim 2, wherein:
the first detection unit detects the first pixel value based on green component expressed by a RGB color space; and
the second detection unit detects the second pixel value based on red component or blue component expressed by the RGB color space.

5. The image-processing device according to claim 3, further comprising a color space conversion unit that converts the color space of the image data into a luminance and chrominance color space that can be handled by the first detection unit.

6. The image-processing device according to claim 4, further comprising a color space conversion unit that converts the color space of the image data into chrominance a RGB color space that can be handled by the first detection unit.

7. The image-processing device according to claim 1, further comprising
a first conversion unit that converts a resolution of the image data to a first resolution,
wherein the first detection unit detects the first pixel value, based on the image data whose resolution is converted to the first resolution by the first conversion unit.

8. The image-processing device according to claim 1, wherein
the first detection unit detects the first pixel value based on image data with a second resolution;
the image-processing device further comprises a second conversion unit that converts the resolution of the image data from the second resolution to a third resolution, the third resolution being lower than the second resolution; and the second detection unit detects the second pixel value, based on the image data whose resolution is converted to the third resolution by the second conversion unit.

9. The image-processing device according to claim 7, wherein the first conversion unit performs resolution conversion by simple pixel skipping.

10. The image-processing device according to claim 8, wherein the second conversion unit perform resolution conversion by simple pixel skipping.

11. An image-reading device, comprising:
a read unit that reads an image and produces image data of a plurality of color components corresponding to the image; and
the image-processing device of claim 1.

12. The image-reading device according to claim 11, wherein the predetermined color component is a color component that represents brightness of an image.

13. The image-reading device according to claim 12, wherein:
the first detection unit detects the first pixel value based on luminance component expressed by a luminance and chrominance color space; and
the second detection unit detects the second pixel value based on chrominance component expressed by the luminance and chrominance color space.

14. The image-reading device according to claim 12, wherein:
the first detection unit detects the first pixel value based on green component expressed by a RGB color space; and
the second detection unit detects the second pixel value based on red component or blue component expressed by the RGB color space.

15. The image-reading device according to claim 13, further comprising a color space conversion unit that converts the color space of the image data into a luminance and chrominance color space that can be handled by the first detection unit.

16. An image-forming device, comprising:
a read unit that reads an image and produces image data of a plurality of color components corresponding to the image;
the image-processing device of claim 1; and
an image-forming unit that forms an image on a recording material, corresponding to image data processed by the image-processing device.

17. The image-forming device according to claim 16, wherein the predetermined color component is a color component that represents brightness of an image.

18. The image-forming device according to claim 17, wherein:
the first detection unit detects the first pixel value based on luminance component expressed by a luminance and chrominance color space; and
the second detection unit detects the second pixel value based on chrominance component expressed by the luminance and chrominance color space.

19. The image-forming device according to claim 17, wherein:
the first detection unit detects the first pixel value based on green component expressed by a RGB color space; and
the second detection unit detects the second pixel value based on red component or blue component expressed by the RGB color space.

20. The image-reading device according to claim 18, further comprising a color space conversion unit that converts the color space of the image data into a luminance and chrominance color space that can be handled by the first detection unit.

* * * * *